(12) United States Patent
Wagh et al.

(10) Patent No.: US 8,638,783 B2
(45) Date of Patent: *Jan. 28, 2014

(54) OPTIMIZED LINK TRAINING AND MANAGEMENT MECHANISM

(71) Applicant: Intel Corporation, Santa Clara, CA (US)

(72) Inventors: Mahesh Wagh, Portland, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,042

(22) Filed: Apr. 9, 2013

(65) Prior Publication Data

US 2013/0318264 A1    Nov. 28, 2013

Related U.S. Application Data

(63) Continuation of application No. 13/477,310, filed on May 22, 2012, now Pat. No. 8,437,343.

(51) Int. Cl.
*H04L 12/50* (2006.01)
*H04Q 11/00* (2006.01)

(52) U.S. Cl.
USPC .......................................................... 370/359

(58) Field of Classification Search
None
See application file for complete search history.

(56) References Cited

U.S. PATENT DOCUMENTS

| | | |
|---|---|---|
| 6,009,488 A | 12/1999 | Kavipurapu |
| 7,769,883 B2 | 8/2010 | Harriman et al. |
| 7,949,794 B2 | 5/2011 | Ajanovic |
| 8,218,580 B2 | 7/2012 | Harriman |
| 2006/0023633 A1 | 2/2006 | Caruk et al. |
| 2006/0184809 A1 | 8/2006 | Kojou et al. |
| 2008/0065796 A1 | 3/2008 | Lee et al. |
| 2008/0109565 A1 | 5/2008 | Ajanovic |
| 2008/0233912 A1 | 9/2008 | Hunsaker et al. |
| 2008/0235528 A1 | 9/2008 | Kim et al. |
| 2008/0294831 A1 | 11/2008 | Mao |
| 2009/0106476 A1* | 4/2009 | Jenkins et al. ................ 710/315 |
| 2009/0141654 A1 | 6/2009 | Voutilainen |
| 2010/0014541 A1 | 1/2010 | Harriman |
| 2010/0081406 A1 | 4/2010 | Tan |
| 2010/0278195 A1 | 11/2010 | Wagh |
| 2010/0325463 A1 | 12/2010 | Lindsay |

(Continued)

OTHER PUBLICATIONS

U.S. Patent and Trademark Office, Final Office Action mailed Mar. 22, 2013 in U.S. Appl. No. 13/477,304.

(Continued)

*Primary Examiner* — Derrick Ferris
*Assistant Examiner* — Kodzovi Acolatse
(74) *Attorney, Agent, or Firm* — Trop, Pruner & Hu, P.C.

(57) ABSTRACT

In one embodiment, a converged protocol stack can be used to unify communications from a first communication protocol to a second communication protocol to provide for data transfer across a physical interconnect. This stack can be incorporated in an apparatus that includes a protocol stack for a first communication protocol including transaction and link layers, and a physical (PHY) unit coupled to the protocol stack to provide communication between the apparatus and a device coupled to the apparatus via a physical link. This PHY unit may include a physical unit circuit according to the second communication protocol. Other embodiments are described and claimed.

19 Claims, 9 Drawing Sheets

(56) References Cited

U.S. PATENT DOCUMENTS

| | | |
|---|---|---|
| 2010/0332868 A1 | 12/2010 | Tan et al. |
| 2011/0060931 A1 | 3/2011 | Radhakrishnan et al. |
| 2011/0066771 A1 | 3/2011 | Renaud |
| 2011/0099405 A1 | 4/2011 | Voutilainen |
| 2011/0138096 A1 | 6/2011 | Radulescu |
| 2012/0017016 A1 | 1/2012 | Ma |
| 2012/0120959 A1 | 5/2012 | Krause |

OTHER PUBLICATIONS

U.S. Appl. No. 13/477,304, filed May 22, 2012, entitled "Providing a Consolidated Sideband Communication Channel Between Devices," by David J. Harriman, et al.

U.S. Appl. No. 13/477,322, filed May 22, 2012, entitled "Providing a Load/Store Communication Protocol With a Low Power Physical Unit," by Sridharan Ranganathan, et al.

U.S. Appl. No. 13/534,541, filed Jun. 27, 2012, entitled "Controlling a Physical Link of a First Protocol Using an Extended Capability Structure of a Second Protocol," by Mahesh Wagh, et al.

U.S. Patent and Trademark Office, Office Action mailed Aug. 7, 2012, with Reply filed Nov. 6, 2012 in the U.S. Appl. No. 13/477,322.

U.S. Patent and Trademark Office, Office Action mailed Sep. 20, 2012 in U.S. Appl. No. 13/477,304.

"Smartphone is next stop for PCI Express" from www.eetimes.com; published Sep. 13, 2012; 2 pages.

"Spec turns USB3 into chip link" from www.eetimes.com; published May 3, 2011; 2 pages.

"M-PHY benefits and challenges" from www.eetimes.com; published Apr. 11, 2011; 8 pages.

"PCIe Over M-PHY May Bring High-Speed I/O to Tables, Smartphones" from www.pcmag.com; published Sep. 13, 2012.

MIPI Alliance, "MIPI Alliance Launches New M-PHY and UniPro Specifications for Mobile Device Applications," Jun. 10, 2011, 1 page.

MIPI Alliance, "Physical Layer Specifications; MIPI Alliance Launches M-PHY v1.0 + UniPro v1.40 Specifications," 2012, 3 pages.

Intel Corporation, "An Introduction to the Intel QuickPath Interconnect," Jan. 2009, pp. 1-22.

U.S. Patent and Trademark Office, Reply to Office Action mailed Sep. 20, 2012, filed Dec. 18, 2012 in U.S. Appl. No. 13/477,304.

* cited by examiner

OPTIMIZED LINK TRAINING AND MANAGEMENT MECHANISM

This application is a continuation of U.S. patent application Ser. No. 13/477,310, filed May 22, 2012, the content of which is hereby incorporated by reference.

TECHNICAL FIELD

Embodiments relate to interconnect technologies.

BACKGROUND

To provide communication between different devices within a system, some type of interconnect mechanism is used. A wide variety of such interconnects are possible depending on a system implementation. Oftentimes to enable two devices to communicate with each other, they share a common communication protocol.

One typical communication protocol for communications between devices in a computer system is a Peripheral Component Interconnect Express (PCI Express™ (PCIe™)) communication protocol in accordance with links based on the PCI Express™ Specification Base Specification version 3.0 (published Nov. 18, 2010) (hereafter the PCIe™ Specification). This communication protocol is one example of a load/store input/output (IO) interconnect system. The communication between the devices is typically performed serially according to this protocol at very high speeds. Various parameters regarding this protocol were developed with the intent to achieve maximum performance without regard to power efficiency, as the PCIe™ communication protocol was developed in the context of desktop computers. As a result, many of its features do not scale down to lower power solutions that could be incorporated into mobile systems.

In addition to these power concerns with conventional load/store communication protocols, existing link management schemes are typically very complex and involve a large number of states, causing a lengthy process to perform transitions between the states. This is due in part to existing link management mechanisms, which were developed to comprehend multiple different form factor requirements such as connectors, different system incorporations and so forth. One such example is link management in accordance with the PCIe™ communication protocol.

DETAILED DESCRIPTION

Figure 1:
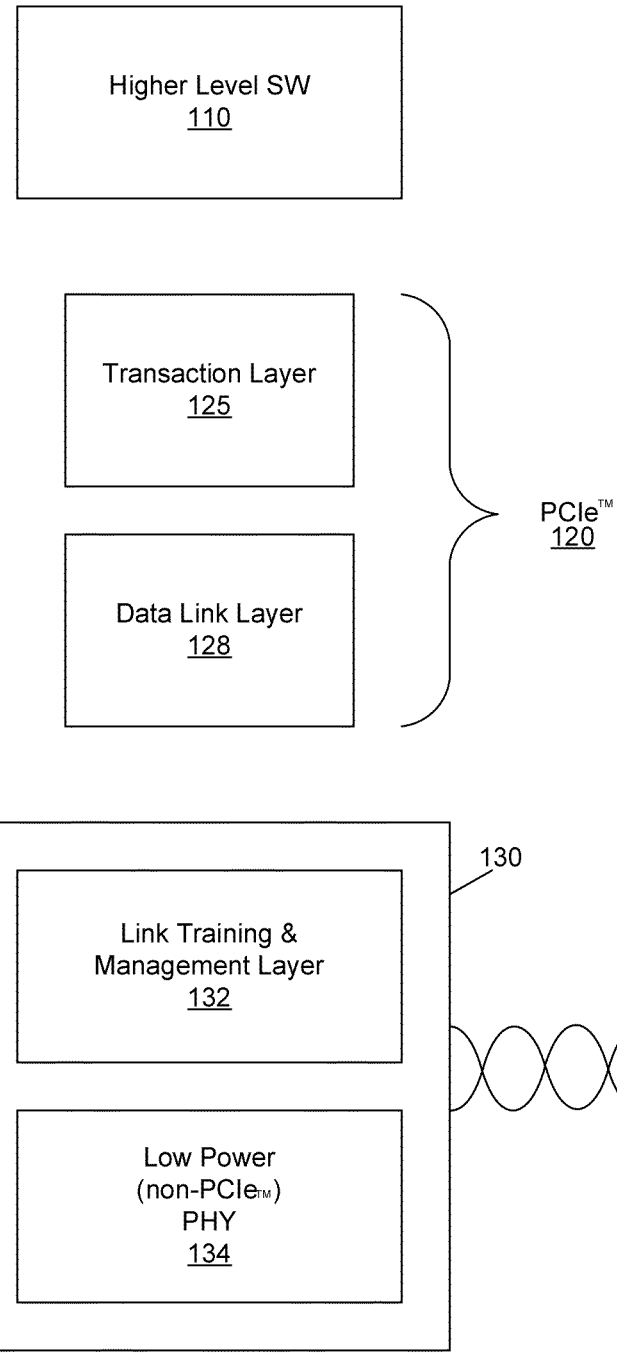
FIG. 1 is a high level block diagram of a protocol stack for a communication protocol in accordance with an embodiment of the present invention.

Embodiments may provide an input/output (IO) interconnect technology that has low power, a load/store architecture, and is particularly suited to use in mobile devices including cellular telephones such as smartphones, tablet computers, electronic readers, Ultrabooks™ and so forth.

In various embodiments, a protocol stack for a given communication protocol can be used with a physical unit of a different communication protocol, or at least a physical (PHY) unit different than the physical unit for the given communication protocol. A physical unit includes both a logical layer and a physical or electrical layer that provides for the actual, physical communication of information signals over an interconnect such as a link that links two independent semiconductor die, which can be two semiconductor die within a single integrated circuit (IC) package or separate packages, coupled, e.g., via a circuit board routing, trace or so forth. In addition the physical unit can perform framing/deframing of data packets, perform link training and initialization, and process the data packets for delivery onto/receipt from a physical interconnect.

Although different implementations are possible, in one embodiment the protocol stack may be of a conventional personal computer (PC)-based communication protocol such as a Peripheral Component Interconnect Express (PCI) Express™ (PCIe™)) communication protocol in accordance with the PCI Express™ Specification Base Specification version 3.0 (published Nov. 18, 2010) (hereafter the PCIe™ specification), a further version that applies protocol extensions, or another such protocol, while the physical unit is not according to the PCIe™ communication protocol. This physical unit can be specially designed for purposes of enabling low power operation to allow incorporation of a substantially unchanged PCIe™ upper protocol stack with this low power physical circuitry. In this way the broad legacy base of the PCIe™ communication protocol can be leveraged for ease of incorporation into portable and other non-PC-based form factors that operate at low power. Although the scope of the present invention is not limited in this regard, in one embodiment this physical unit may be a physical unit adapted from a mobile platform such as a so-called M-PHY according to the M-PHY Specification Version 1.00.00—8 Feb. 2011 (MIPI Board Approved 28 Apr. 2011) of the Mobile Industry Processor Interface (MIPI) Alliance (hereafter MIPI specification), which is a group that sets standards for mobile computing devices. However, other low power physical units such as according to other low power specifications such as used to couple together individual dies within a multi-chip package, or a custom low power solution can be used. As used herein, the term "low power" means at a power consumption level below a conventional PC system, and which may be applicable to a wide variety of mobile and portable devices. As an example, "low power" may be a physical unit that consumes less power than a conventional PCIe™ physical unit.

In this way, by converging a traditional PCIe™ protocol stack with a different type of physical unit, high amounts of reuse of legacy components that have been developed for PCIe™ can be leveraged for incorporation into a mobile or other portable or low power platform.

Embodiments also may leverage the recognition that existing load/store IO technologies, particularly PCIe™, are designed with the intent to achieve maximum performance where power efficiency is not a primary concern, and thus do not scale down to low power applications. By combining portions of a conventional load/store protocol stack with a physical unit of a low power design, embodiments may preserve the performance advantages of PCIe™, while achieving best in class power at the device and platform levels.

As such, embodiments may be software compatible with ubiquitous PCIe™ architectures that have a large legacy base. In addition, embodiments may also enable direct PHY re-use of a mobile-designed PHY, e.g., a M-PHY. In this way, low active and idle power can be realized with efficient power/bit transferred, along with an approach that is electromagnetic interface/radio frequency interface (EMI/RFI) friendly, as the PHY may operate at clock rates that do not interfere with associated radios (since harmonics of the clock frequency for the PHY do not interfere with common radio frequencies at which typical radio solutions operate (e.g., 1.8, 1.9, 2.4 gigahertz (GHz) or other such radio frequencies).

Embodiments may further provide for architectural enhancements that enable an optimized link training and management mechanism (LTSSM); optimized flow control and retry buffering and management mechanisms; an architected protocol for changing link operating mode; fast hardware-supported device state save and restore; and a consolidated sideband mechanism for link management with optional in-band support.

In various embodiments, PCIe™ transaction and data link layers can be implemented as part of a protocol stack with limited modifications to account for different link speeds and asymmetric links. In addition, revised link training and management may be provided to include support for multi-lane communications, asymmetric link configurations, sideband consolidation, and dynamic bandwidth scalability. Embodiments may further provide support for bridging between existing PCIe™-based and non-PCIe™-based logic and circuitry such as M-PHY logic and circuitry.

This layering approach enables existing software stacks (e.g., operating system (OS), virtual machine managers and drivers) to run seamlessly on a different physical layer. The impact to the data link and transaction layer is minimized and may include updating of timers related to update acknowledgment frequency, replay timers and such.

Thus embodiments can limit some of the flexibility afforded in PCIe™ systems, as this flexibility can in some cases create certain complexities in both PCIe™ systems and other systems. This is so, as both of these protocols provide for a great deal of flexibility to enable plug-and-play capability. Instead, embodiments can tailor a solution that minimizes the amount of flexibility in a design, since when incorporated into a given system, e.g., as a system on a chip (SoC) interconnected to another integrated circuit (IC), a known and fixed configuration occurs. Because it is known on implementation the exact configuration that is present, as both the SoC and the connected device are affixed within the platform, e.g., soldered to a circuit board of the system, no plug-and-play capability with regard to these devices is needed and thus the greater flexibility inherent in a PCIe™ or other PC-based communication protocol that enables seamless incorporation of different devices into a system with plug-and-play capability may not be needed.

As one example, the SoC can act as a root complex that is implemented in a first IC, and is coupled to a second IC that may be a radio solution, which can include one or more devices of multiple wireless communication devices. Such devices can range from low power short range communication systems such as in accordance with a Bluetooth™ specification, local wireless communications such as a so-called WiFi™ system in accordance with a given Institute of Electrical and Electronics Engineers (IEEE) 802.11 standard, to a higher power wireless system such as a given cellular communication protocol such as a 3G or 4 G communication protocol.

Referring now to FIG. 1, shown is a high level block diagram of a protocol stack for a communication protocol in accordance with an embodiment of the present invention. As shown in FIG. 1, stack 100 can be a combination of software, firmware and hardware within a semiconductor component such as an IC to provide for handling of data communication between the semiconductor device and another device coupled to it. In the embodiment of FIG. 1, a high level view is shown beginning with a higher level software 110, which can be various types of software that execute on a given platform. This higher level software can include operating system (OS) software, firmware, application software and so forth. Data to be communicated via an interconnect 140 that may be a given physical interconnect that couples the semiconductor device with another component can pass through various layers of a protocol stack, generally shown within FIG. 1. As seen, portions of this protocol stack can be part of a conventional PCIe™ stack 120 and may include a transaction layer 125 and a data link layer 128. In general, transaction layer 125 acts to generate transaction layer packets (TLP), which can be request or response-based packets separated by time, allowing the link to carry other traffic while the target device gathers data for the response. The transaction layer further handles credit-based flow control. Thus transaction layer 125 provides an interface between a device's processing circuitry and the interconnect architecture, such as a data link layer and a physical layer. In this regard, a primary responsibility of the transaction layer is the assembly and disassembly of packets (i.e., transaction layer packets (TLPs)), as well as handling credit-based flow control.

In turn, data link layer 128 may sequence TLPs that are generated by the transaction layer and ensure reliable delivery of TLPs between two endpoints (including handling error checking) and acknowledgement processing. Thus link layer 128 acts as an intermediate stage between the transaction layer and the physical layer, and provides a reliable mechanism for exchanging TLPs between two components by a link. One side of the link layer accepts TLPs assembled by the transaction layer, applies identifiers, calculates and applies an error detection code, e.g., cyclic recovery codes (CRC), and submits the modified TLPs to the physical layer for transmission across a physical link to an external device.

After processing in data link layer 128, packets can be communicated to a PHY unit 130. In general, PHY unit 130 may include a low power PHY 134, which may include both logical layers and physical (including electrical) sub-layers. In one embodiment, the physical layer represented by PHY unit 130 physically transmits a packet to an external device. The physical layer includes a transmit section to prepare outgoing information for transmission and a receiver section to identify and prepare received information before passing it to the link layer. The transmitter is supplied with symbols that are serialized and transmitted to an external device. The receiver is supplied with serialized symbols from the external device and transforms the received signals into a bitstream. The bitstream is de-serialized and supplied to a logical sub-block.

In one embodiment, low power PHY 134, which can be a given low power PHY either developed specially or adapted from another PHY such as an M-PHY, can provide for processing of the packetized data for communication along interconnect 140. As further seen in FIG. 1, a link training and management layer 132 (also referred to herein as link manager) may also be present within PHY unit 130. In various embodiments, link manager 132 can include certain logic that can be implemented from another communication protocol such as a PCIe™ protocol and specialized logic to handle interfacing between the conventional, e.g., PCIe™ protocol stack above, and the physical PHY 134 of a different protocol.

In the embodiment of FIG. 1, interconnect 140 can be implemented as differential pairs of wires that may be two pairs of unidirectional wires. In some implementations, multiple sets of differential pairs may be used to increase bandwidth. Note that according to the PCIe™ communication protocol, the number of differential pairs in each direction is required to be the same. According to various embodiments, however, different numbers of pairs can be provided in each direction, which allows more efficient and lower power operation. This overall converged stack and link 140 may be referred to as a Mobile Express PCIe™ interconnect or link. While shown at this high level in the embodiment of FIG. 1, understand the scope of the present invention is not limited in this regard. That is, understand that the view shown in FIG. 1 is simply with regard to the protocol stack from the transaction layer through the physical layer, along with higher level software, and various other circuitry of a SoC or other semiconductor device including this stack is not shown.

Figure 2:
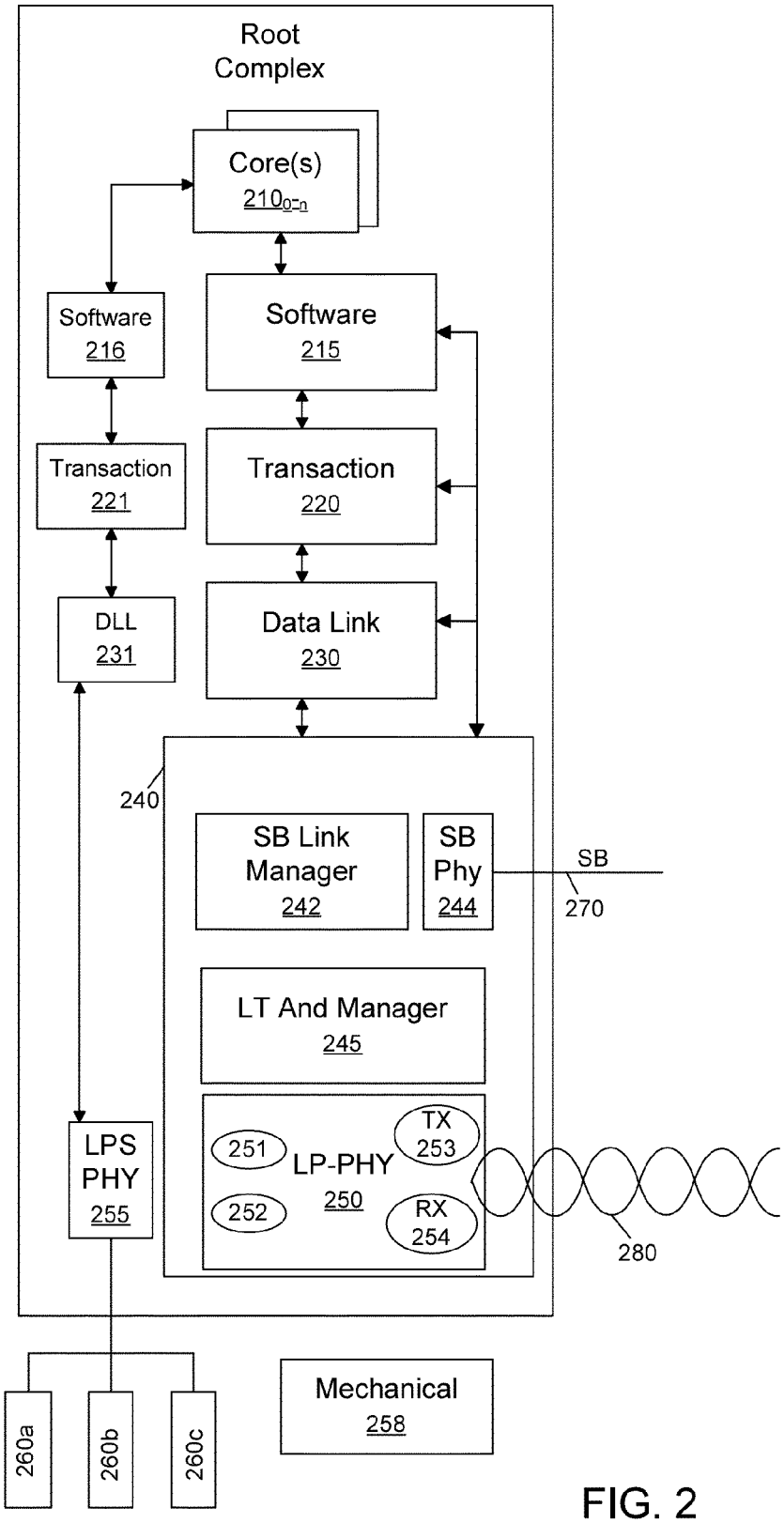
FIG. 2 is a block diagram of a system-on-a-chip (SoC) in accordance with an embodiment of the present invention.

Referring now to FIG. 2, shown is a block diagram of a SoC in accordance with an embodiment of the present invention. As shown in FIG. 2, SoC 200 can be any type of SoC for implementation into various types of platforms, ranging from relatively small low power portable devices such as smartphones, personal digital assistants (PDAs), tablet computers, netbooks, Ultrabooks™ and so forth, to more advanced SoCs that can be implemented in higher level systems.

As seen in FIG. 2, SoC 200 may include one or more cores $210_0$-$210_n$. Thus in various embodiments, a multicore SoC is possible, where the cores all may be homogeneous cores of a given architecture, e.g., an in-order or out-of-order processor. Or there can be heterogeneous cores, e.g., some relatively small low power cores, e.g., of an in-order architecture, with additional cores present that may be of a larger and more complicated architecture, e.g., an out-of-order architecture. A protocol stack enables communication of data between one or more of these cores and other components of a system. As seen, this stack can include software 215, which may be higher level software such as OS, firmware, and application level software that executes on one or more of the cores. In addition, the protocol stack includes a transaction layer 220 and a data link layer 230. In various embodiments, these transaction and data link layers may be of a given communication protocol such as a PCIe™ protocol. Of course, layers of different protocol stacks such as in accordance with a universal serial bus (USB) protocol stack may be present in other embodiments. Also, in some implementations low power PHY circuitry as described herein can be multiplexed with existing alternate protocol stacks.

Still referring to FIG. 2, in turn this protocol stack can couple to a physical unit 240 that may include multiple physical units that can provide for communication via multiple interconnects. In one embodiment, a first physical unit 250 may be a low power PHY unit that in one embodiment may correspond to an M-PHY in accordance with the MIPI specification to provide communication via a primary interconnect 280. In addition, a sideband (SB) PHY unit 244 may be present. In the embodiment shown, this sideband PHY unit may provide for communication via a sideband interconnect 270, which may be a consolidated sideband to provide certain sideband information, e.g., at slower data rates than primary interconnect 280 that is coupled to first PHY 250. In some embodiments, the various layers of the protocol stack can have a separate sideband coupling to this SB PHY 244 to enable communication along this sideband interconnect.

In addition, PHY unit 240 may further include an SB link manager 242 that can be used to control SB PHY 244. In addition, a link training and state manager 245 may be present and can be used to adapt the protocol stack, which is of a first communication protocol, to first PHY 250, which is of a second communication protocol, as well as providing overall control of first PHY 250 and interconnect 280.

As further seen, various components may be present in first PHY 250. More specifically, transmitter and receiver circuitry (namely TX 253 and RX 254) may be present. In general, this circuitry may be used to perform serialization operations, deserialization operations along with the transmission and receipt of data via primary interconnect 280. A save state manager 251 may be present and can be used to save a configuration and other state information regarding first PHY 250 when it is in a low-power state. Also, a coder 252 can be present to perform line coding, e.g., according to an 8b/10b protocol.

As further seen in FIG. 2, a mechanical interface 258 may be present. This mechanical interface 258 may be a given interconnection to provide communication from root complex 200, and more specifically to/from first PHY 250 via primary interconnect 280. In various embodiments, this mechanical connection can be by way of pins of the semiconductor device such as a ball grid array (BGA) or other surface mount, or plated through hole connection.

In addition to these main communication mechanisms, an additional communication interface may be by way of a low power serial (LPS) PHY unit 255, coupled via a separate stack including a software layer 216, a transaction layer 221, and a link layer 231 between cores 210 and one or more off-chip devices 260a-c, which can be various low data rate peripheral devices such as sensors, accelerometers, temperature sensors, global positioning system (GPS) circuitry, compass circuitry, touch-screen circuitry, keyboard circuitry, mouse circuitry and so forth.

Note that in various embodiments, both the sideband interconnect 270 and primary interconnect 280 can couple between SoC 200 and another semiconductor component, e.g., another IC, such as a multi-band radio solution.

Figure 3:
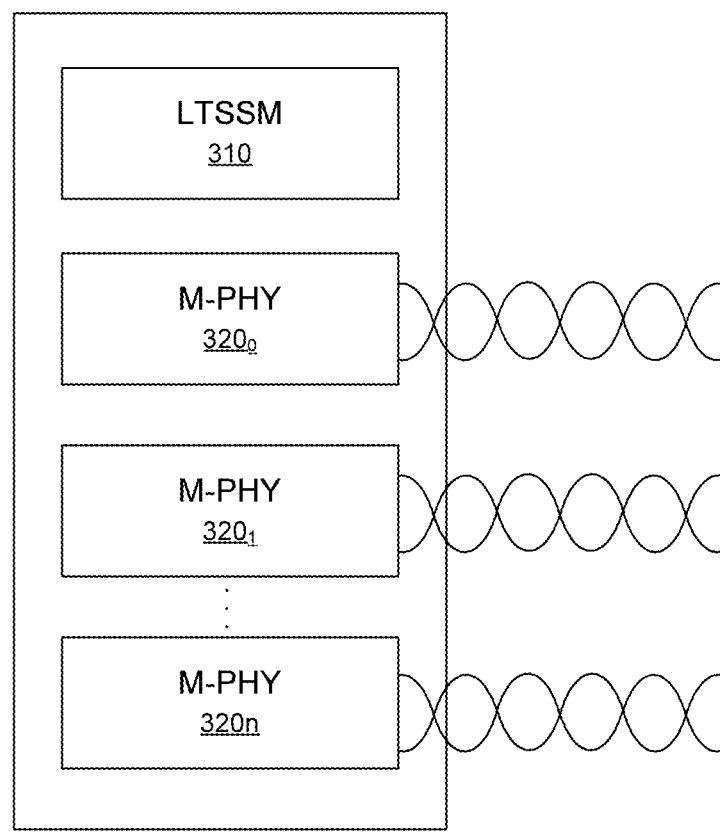
FIG. 3 is a block diagram of a physical unit in accordance with another embodiment of the present invention.

Again while the illustration of FIG. 2 is at a relatively high level, variations are possible. For example, it is possible to provide multiple low power PHYs to enable higher rates of data communication, e.g., via multiple channels, where each channel is associated with an independent PHY. Referring now to FIG. 3, shown is a block diagram of a physical unit in accordance with another embodiment of the present invention. As shown in FIG. 3, physical unit 300 includes a link training and state manager 310. This state manager may be as described above, and can be a collection of logic to enable interfacing of a protocol stack of a first communication protocol with a physical unit of a second, e.g., different communication protocol.

As further seen in FIG. 3, link training and state manager 310 may be in communication with multiple M-PHYs $320_0$-$320_n$. By providing more than one such PHY, higher rates of data communication can occur. Note that while each M-PHY illustrated in FIG. 3 may include some amount of logic to enable its individual, independent communications to occur, the overall control of communications of these different M-PHYs may be via link training and state manager 310. Also, understand that while a plurality of M-PHYs are shown in FIG. 3, in other embodiments, multiple PHY units of another type can be present, and further multiple heterogeneous PHY units can be provided. Note that each M-PHY unit can be used either as part of a unique logical link, or in groups where a group is associated with a single logical link. Each device may typically consume a single logical link, although in some embodiments a single physical device may consume multiple logical links, e.g., to provide dedicated link resources for different functions of a multi-function component.

Figure 4:
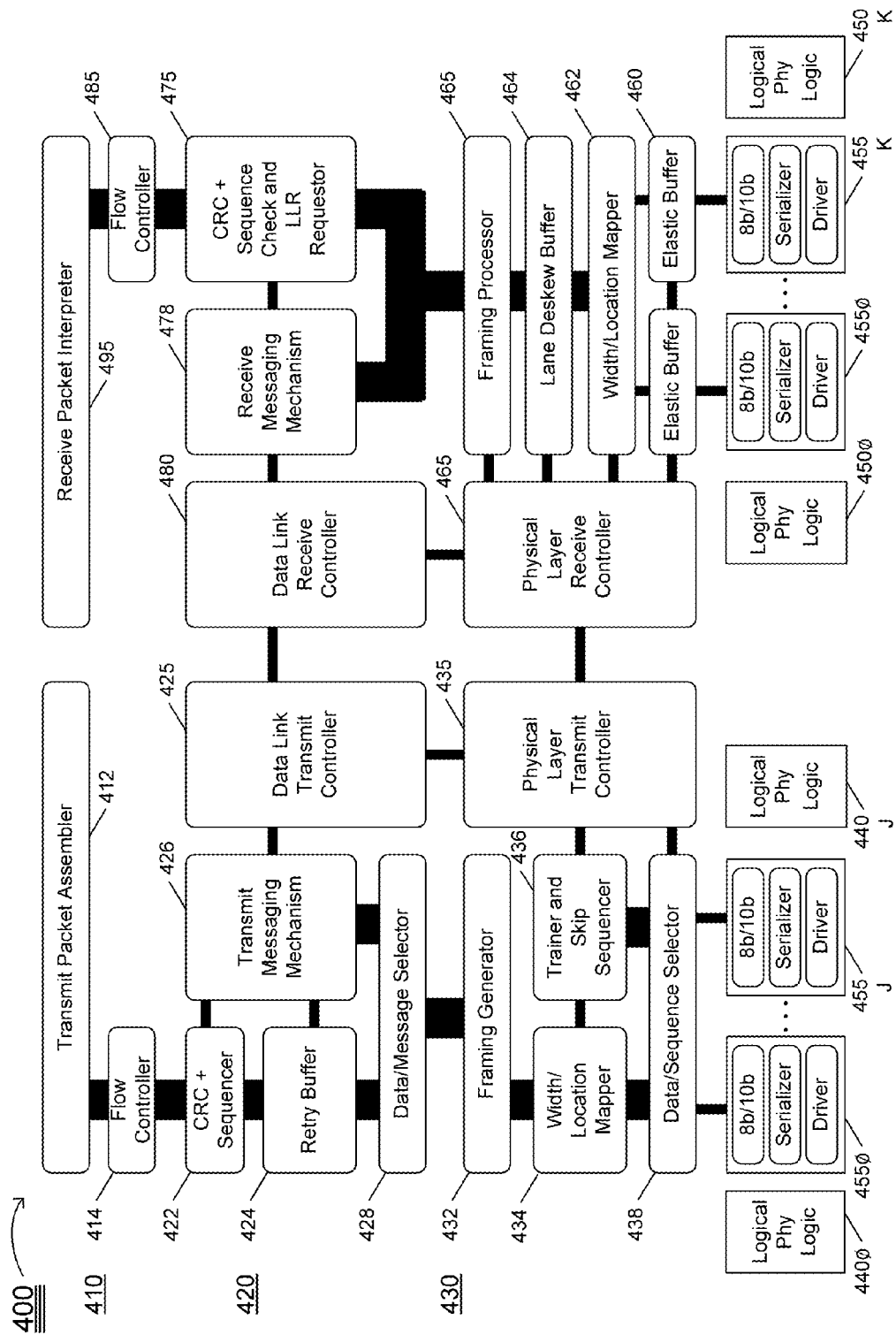
FIG. 4 is a block diagram showing further details of a protocol stack in accordance with an embodiment of the present invention.

Referring now to FIG. 4, shown is a block diagram showing further details of a protocol stack in accordance with an embodiment of the present invention. As shown in FIG. 4, stack 400 includes various layers including a transaction layer 410, a data link layer 420, and a physical layer 430. As described above, these different layers can be configured using either conventional transaction and data link portions of a PCIe™ protocol stack, or modified versions of such stack to accommodate interaction between these layers of this first communication protocol and a physical layer of another communication protocol, which in the embodiment of FIG. 4 may be M-PHYs according to the MIPI specification.

As seen in FIG. 4 with regard to a transmit direction in which information is transmitted from protocol stack 400, incoming information to the protocol stack, e.g., from other circuitry of a SoC such as a core or other processing logic, is received in a transmit packet assembler 412 of the transaction layer, which typically combines control and data paths to form a TLP. After being assembled into transmit packets, which in various embodiment can be data packets having, e.g., 1 to 4096 bytes (or of a smaller maximum allowed size, e.g., 128 or 256), the assembled packets are provided to a flow controller 414 which determines whether sufficient flow control credits are available based on the number required for the next TLP(s) queued for transmission and controls the injection of packets into data link layer 420. More specifically as seen, these injected packets are provided an error detector and sequencer 422 which in one embodiment may generate a TLP sequence number and LCRC. As further seen, data link layer 420 further includes a transmit messaging mechanism 426 that in turn generates DLLPs for link management functions and is coupled to a data link transmit controller 425 which is a controller functionality for flow control and data link integrity (ACK/NAK) mechanisms; note that this may be subdivided such that these functions are implemented using distinct logic blocks.

As further seen, the processed data packets are provided to a retry buffer 424, which holds a copy of each TLP until acknowledged by the component on the other side of the link, note that this may in practice be implemented with buffering higher up the stack (in or above assembler 412) and they can be stored in corresponding entries until selected for transmission to physical layer 430 via a data/message selector 428. In general, the above-described transaction and data link layers may operate in accordance with conventional PCIe™ protocol stack circuitry, with certain modifications as will be described further below.

Instead with regard to physical layer 430, many more modifications of certain logical components of this layer, e.g., as modified from a PCIe™ protocol stack may occur as well as for providing interfacing to the actual physical portions of the physical unit of another communication protocol. As seen, the incoming packets may be applied to a framing generator 432, which adds physical layer framing symbols and generates framing for the packets and provides them to a width/location mapper 434 that shifts the bytes in the datapath to generate the required alignment for the external transmission, adjusting datapath width if needed and in turn is coupled to a trainer and skip sequencer 436, which may be used to perform link training and skip sequencing. As seen, framing generator 432, trainer/sequencer 436 and a data/sequence selector 438 all may be coupled to a physical layer transmit controller 435 which is a transceiver portion of LTSSM and related logic. Block 436 is logic to generate physical layer transmissions such as training sets (TS) and skip ordered sets. In this way, the framed packets may be selected and provided to physical circuitry to perform coding, serialization and driving of the serialized signals corresponding to the processed packets onto a physical interconnect. In one embodiment, the mapping of symbol differences between the different communication protocols may be performed in the framing generator 432.

As seen, multiple individual channels or lanes can be provided for this physical interconnect. In the embodiment shown, each physical channel or lane can include its own independent PHY unit transmit circuitry $445_0$-$445_j$, each of which in one embodiment can be part of an M-PHY unit in accordance with the MIPI specification. As described herein unlike PCIe™ where the number of transmitters and receivers match, different numbers of transmitters and receivers may be present. Thus as seen, each transmit circuit 445 can include an encoder which acts to encode symbols according to an 8b/10b encoding, a serializer to serialize the encoded symbols, and a driver to drive the signals onto the physical interconnect. As further seen, each lane or channel may be associated with a logical unit $440_0$-$440_j$, which may be logical circuitry according to the MIPI specification for an M-PHY to thus manage the physical communication via the corresponding lane.

Note that these multiple lanes can be configured to operate at different rates, and embodiments may include different numbers of such lanes. Furthermore, it is possible to have different numbers of lanes and lane speeds in transmit and receive directions. Thus although a given logic unit 440 controls the operation of a corresponding lane of PHY 445, understand that physical layer transmit controller 435 may act to control the overall transmission of information via the physical interconnect. Note that in some cases, some very basic functionality is performed by distinct logic associated with each lane; for cases where lanes can be allocated to more than a single link, multiple LTSSM instances may be provided; for a trained link, there is a single LTSSM in each component controlling both the transceiver and receiver sides. This overall control can include power control, link speed control, link width control, initialization and so forth.

Still referring to FIG. 4, incoming information received via physical interconnects may similarly pass through physical layer 430, data link layer 420, and transaction layer 410 via receive mechanism of these layers. In the embodiment shown in FIG. 4, each PHY unit may further include receive circuitry, namely receive circuitry $455_0$-$455_k$, which in the embodiment shown can be present for each lane of the physical link. Note that in this embodiment, the number of receiver circuits 455 and transmitter circuits 445 is different. As seen, this physical circuitry can include an input buffer to receive incoming information, a deserializer to deserialize the information, and a decoder which may act to decode the symbols communicated in an 8b/10b encoding. As further seen, each lane or channel may be associated with a logical unit $450_0$-$450_k$, which may be logical circuitry according to a given specification (such as the MIPI specification for an M-PHY) to thus manage the physical communication via the corresponding lane.

The decoded symbols in turn may be provided to a logical portion of physical layer 430, which as seen may include elastic buffers 460 where the elastic buffer accommodates differences in clocking between this component and the other component on the link; note that its location may shift in various implementations, e.g., to be below the 8b/10b decoder, or to be combined with the lane deskew buffer and to store the incoming decoded symbols. In turn, the information may be provided to a width/location mapper 462, and from there to a lane deskew buffer 464 that performs deskew across multiple lanes and for multi-lane cases, buffer 464 can handle differences in signal skew between lanes to re-align bytes. In turn, the deskewed information may be provided to a framing processor 466 which may remove framing present in the incoming information. As seen, a physical layer receive controller 465 may be coupled to and control elastic buffers 460, mapper 462, deskew buffer 464, and framing processor 466.

Still referring to FIG. 4, the recovered packets may be provided to both a receive messaging mechanism 478 and an error detector, sequence checker and link level retry (LLR) requestor 475. This circuitry may perform error correction checking on the incoming packets, e.g., by way of performing CRC checksum operations, performing sequencing checks, and requesting link level retry of packets incorrectly received. Both receive messaging mechanism 478 and error detector/requestor 475 may be under control of a data link receive controller 480.

Still referring to FIG. 4, the packets thus processed in unit 475 may be provided to transaction layer 410, and more specifically to a flow controller 485, which performs flow control on these packets to provide them to a packet interpreter 495. Packet interpreter 495 performs interpretation of the packets and forwards them on to a selected destination, e.g., a given core or other logic circuitry of the receiver. Although shown at this high level in the embodiment of FIG. 4, understand that the scope of the present invention is not limited in this regard.

Note that PHYs 440 may use the same 8b/10b encoding as supported by PCIe™ for transmission. The 8b/10b encoding scheme provides special symbols that are distinct from data symbols used to represent characters. These special symbols may be used for various link management mechanisms as described in the physical layer chapter of the PCIe™ specification. Additional special symbol usages by the M-PHY are described in the MIPI M-PHY specification. Embodiments may provide for a mapping between PCIe™ and MIPI M-PHY symbols.

Referring now to Table 1, shown is an exemplary mapping of PCIe™ symbols to M-PHY symbols in accordance with one embodiment of the present invention. Thus this table shows mapping of special symbols for a converged protocol stack in accordance with one embodiment of the present invention.

TABLE 1

| Control Symbols | PCIe Encoding | Mapping of Converged Stack | MIPI M-PHY Mapping | Comment |
|---|---|---|---|---|
| K28.5 | COM | COM | Marker0 | |
| K28.3 | IDL | IDL | Marker1 | |
| K28.6 | Reserved | SDP | Marker2 | Note: Map SDP here since the original PCIe encoding maps to M-PHY reserved encoding. |
| K23.7 | PAD | SKP | Marker3 | Note: Map SKP to neutral disparity K23.7 symbol since it does not advance the scrambler/descrambler. |
| K27.7 | STP | STP | Marker4 | |
| K29.7 | END | END | Marker5 | |
| K30.7 | EDB | EDB | Marker6 | |
| K28.1 | FTS | PAD | Filler | Note: Map PAD here since SKP has taken its encodings. FTS is not needed since the M-PHY SYNC mechanism can be used. M-PHY SYNC mechanism is a better option since the defined SYNC symbols have higher edge density. RMMI spec requires M-PHY to insert Fillers when TX_DORDY is low. |
| K28.0 | SKP | Reserved | Reserved | |
| K28.2 | SDP | Reserved | Reserved | |
| K28.7 | EIE | Reserved | Reserved | Note: EIE is not required since M-PHY squelch is detecting DIF-Z to DIF-N transition. |
| Others | Reserved | Reserved | Reserved | |

The 8b/10b decode rules are the same as defined for PCIe™ specification. The only exception for 8b/10b rules is when detecting a TAIL OF BURST, which is a specific sequence that violates the 8b/10b rules. According to various embodiments, physical layer 430 can provide a notification to data link layer 420 of any errors encountered during the TAIL OF BURST.

In one embodiment, the framing and application of symbols to lanes may be as defined in the PCIe™ specification, while data scrambling can be the same as defined in the PCIe™ specification. Note however that the data symbols transmitted in the PREPARE phase of a communication according to the MIPI-specification are not scrambled.

With regard to link initialization and training, the link manager may provide for configuration and initialization of the link which as discussed above can include one or more channels of lanes, support of normal data transfers, support of state transitions when recovering from link errors, and port restart from a low power state.

To effect such operation, the following physical and link-related features may be known a priori, e.g., prior to initialization: PHY parameters (e.g., including initial link speed and supported speed; and initial link width and supported link widths).

In one embodiment, training may include various operations. Such operations may include initializing the link at the configured link speed and width, bit lock per lane, symbol lock per lane, lane polarity, and lane-to-lane deskew for multi-lane links. In this way, training can discover lane polarity and perform adjustments accordingly. However, note that link training in accordance with an embodiment of the present invention may not include link data rate and width negotiation, link speed and width degradation. Instead as described above upon initialization of a link, both entities a priori know the initial link width and speed and thus the time and computation expense associated with negotiation can be avoided.

PCIe™ ordered sets can be used with the following modifications: TS1 and TS2 ordered sets are used to facilitate IP re-use but many fields of the training ordered sets are ignored. Also, fast training sequences are not used. An electrical idle ordered set (EIOS) may be retained to facilitate IP re-use, as is a Skip OS, but the frequency of Skip OS may be at a different rate than according to the PCIe™ specification. Note also that data stream ordered sets and symbols may be the same as according to the PCIe™ specification.

The following events are communicated to facilitate link training and management: (1) presence, which can be used to indicate that an active PHY is present on the remote end of the link; and (2) configuration ready, which is triggered to indicate that PHY parameter configuration is completed and the PHY is ready operate at configured profile. In one embodiment such information can be communicated via a consolidated sideband signal in accordance with an embodiment of the present invention For purposes of control of electrical idle situations, the PHY has a TAIL OF BURST sequence that is used to indicate that the transmitter is entering into an electrical idle state. In one embodiment, the sideband channel may be used to signal exit from electrical idle. Note that this indication may be in addition to PHY squelch break mechanisms. An OPENS sequence of symbols may be transmitted as an EIOS to indicate entry into electrical idle state.

In some embodiments, a fast training sequence (FTS) is not defined. Instead, a PHY may use a specific physical layer sequence for exit from stall/sleep state to a burst state that can be used to address bit lock, symbol lock and lane-to-lane de-skew. A small number of FTS can be defined as a sequence of symbols for robustness. A start of data stream ordered set may be according to the PCIe™ specification, as is link error recovery.

As to link data rates, in various embodiments the initial data rate at which the link initializes may be at a predetermined data rate. A data rate change from this initial link speed may occur by going through a recovery state. Embodiments may support asymmetric link data rates where the data rate is permitted to be different in opposite directions.

In one embodiment, the link widths supported may be according to those of the PCIe™ specification. Further, as described above, embodiments may not support a protocol for negotiating link width as the link width is predetermined, and as a result link training may be simplified. Of course, embodiments may provide support for asymmetric link widths in opposite directions. At the same time, the initial link width and the initial data rate to be configured for each direction of the link may be a priori known before training starts.

With respect to physical ports of the PHY unit, the ability for a ×N port to form a ×N link as well as a ×1 link (where N can be 32, 16, 12, 8, 4, 2, and 1) is not required and the ability for a ×N port to form any link width between N and 1 is optional. An example of this behavior includes a ×16 port, which can only configure into only one link, but the width of the link can be configured to be ×12, ×8, ×4, ×2 as well as required widths of ×16 and ×1. As such, designers seeking to implement devices using a protocol stack in accordance with an embodiment of the present invention can connect ports between two different components in a way that allows those components to meet the above requirements. If the ports between components are connected in ways that are not consistent with intended usage as defined by the component's port descriptions/data sheets, behavior is undefined.

In addition, the ability to split a port into two or more links is not prohibited. If such support is appropriate for a given design, the port can be configured to support a specific width during training. An example of this behavior would be a ×16 port that may be able to configure two ×8 links, four ×4 links, or 16×1 links.

When using 8b/10b encoding, an unambiguous lane-to-lane de-skew mechanism, as in the PCIe™ specification, is the COM symbol of ordered sets received during training sequence or SKP ordered sets, since ordered sets are transmitted simultaneously on all lanes of a configured link. The MK0 symbol transmitted during the sync sequence of HS-BURST may be used for lane-lane de-skew.

As briefly described above with regard to FIG. 4, a link training and state manager can be configured to perform various operations, including adapting the upper layers of a PCIe™ protocol stack to a lower layer PHY unit of a different protocol. Furthermore, this link manager can configure and manage single or multiple lanes and may include support for a symmetric link bandwidth, compatibility of the state machine with PCIe™ transaction and data link layers, link training, optional symmetric link stall states, and control of sideband signals for robust communications. Accordingly, embodiments provide for implementing PCIe™ transaction and data link layers with limited modifications to account for different link speeds and asymmetric links. Furthermore, using a link manager in accordance with an embodiment of the present invention, support for multi-lane, asymmetric link configuration, sideband consolidation and dynamic bandwidth scalability can be realized, while further enabling bridging between layers of different communication protocols.

Figure 5:
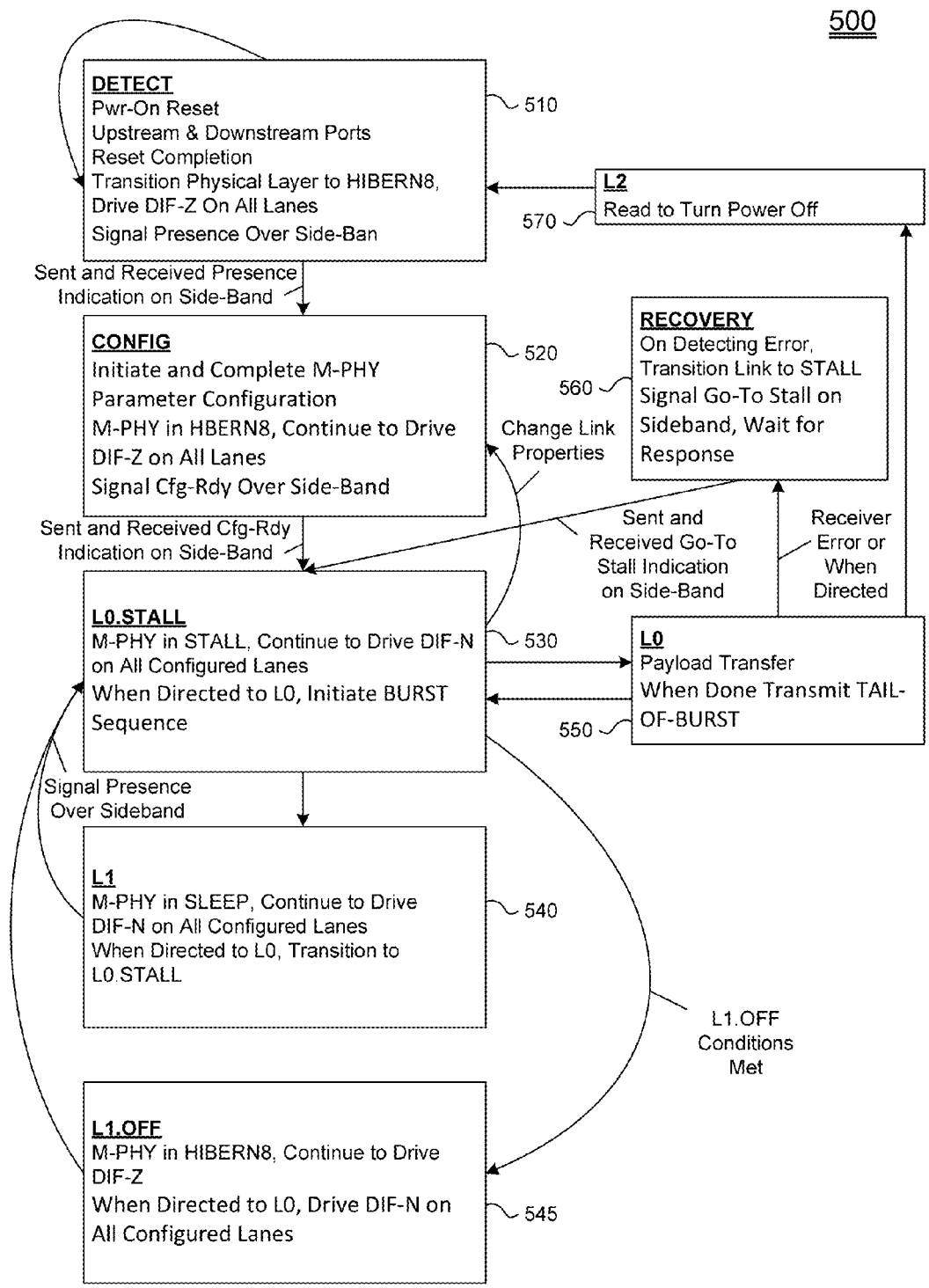
FIG. 5 is a state diagram for a link training state machine, which can be part of a link manager in accordance with an embodiment of the present invention.

Referring now to FIG. 5, shown is a state diagram 500 for a link training state machine, which can be part of a link manager in accordance with an embodiment of the present invention. As shown in FIG. 5, link training can begin in a detection state 510. This state occurs on power on reset and is applicable both to upstream and downstream ports. After reset completion, all configured lanes may transition to a given state, namely a HIBERN8 state, upon which each end of the link can signal, e.g., via a PRESENCE signal using a sideband channel. Note that in this detection state, a high impedance signal, namely a DIF-Z signal, may be driven on all lanes.

Thus control passes from detect state 510 to configuration state 520 when the PRESENCE event is signaled and received, and this high impedance is driven on all configured lanes. In configuration state 520, the PHY parameters can be configured and upon completion on all configured lanes of each end of the link, a configuration ready signal (CFG-RDY) can be indicated, e.g., using the sideband interconnect, while the high impedance is maintained on all lanes.

Thus upon the sending and receiving of this configuration ready indication via the sideband interconnect, control passes to a stall state 530. Namely in this L0.STALL state, the PHY transitions to a STALL state and continues to drive the high impedance on all configured lanes. As seen, depending on whether data is available for transmission or receipt control can pass to an active state L1 (state 530), a low power state (L1 state 540), a deeper low power state (L1.OFF state 545), or back to configuration state 520.

Thus in the STALL state, a negative drive signal DIF-N can be communicated on all configured lanes. Then when directed by the initiator a BURST sequence may begin. Accordingly, control passes to active state 530 after transmission of a MARKER 0 (MK0) symbol.

In one embodiment, a receiver may detect exit from the STALL state on all configured lanes and perform a bit lock and symbol lock according, e.g., to the MIPI specification. In embodiments with a multi-lane link, this MK0 symbol may be used to establish lane-to-lane deskew.

Instead when directed to a low power state (namely the L1 state 540), all configured lanes may transition to a SLEEP state. In turn when directed to a deeper low power state (namely L1.OFF state 545), all configured lanes may transition to the HIBERN8 state. Finally, when directed back to the configuration state, similarly all configured lanes transition to the HIBERN8 state.

Still referring to FIG. 5, for active data transfer, control thus passes to active state 550. Specifically, this is the state where link and transaction layers begin exchanging information using data link layer packets (DLLPs) and TLPs. As such, a payload transfer can occur and at the conclusion of such transfer, a TAIL of BURST symbol can be communicated.

As seen, from this active state control can pass back to STALL state 530, to a recovery state 560, e.g., responsive to a receiver error or when otherwise directed, or to a deeper low power (e.g., an L2) state 570.

To return to the stall state, the transmitter may send an EIOS sequence followed by a TAIL of BURST indication on all configured lanes.

If an error occurs or otherwise as directed, control can also pass to recovery state 560. Here, a transition to recovery causes all configured lanes in both directions to enter into the STALL state. To effect this, a GO TO STALL signal can be sent on the sideband interconnect and the transmitter of this signal can wait for a response. When this stall signal has been sent and received, as indicated by a received GO TO STALL indication on the sideband interconnect, control passes back to STALL state 530. Note that this recovery state thus establishes the protocol using the sideband to coordinate simultaneous entry into the STALL state.

With regard to low power states L1 and L1.OFF, operation is according to states 540 and 545. Specifically, control passes to the L1 lower power state 540 from the STALL state so that the PHY can be placed into a SLEEP state. In this state, a negative drive signal, namely a DIF-N signal can be driven on all configured lanes. When directed to exit the state, control passes back to STALL state 530, e.g., via signaling of a PRESENCE signal over the sideband interconnect.

As also seen, the deeper low state L1.OFF can be entered when all L1.OFF conditions have been met. In one embodiment, these conditions may include completely power gating or turning off power to the PHY unit. In this deeper low power state, the PHY may be placed in the HIBERN8 state, and the high impedance signal driven on all configured lanes. To exit this state, control passes back to the STALL state, via driving of DIF-N on all configured lanes.

As further seen in FIG. 5, additional states can be present, namely a still further deeper low power state (L2) 570, which can be entered from an active state when power is ready to turn off. In one embodiment, this state may be the same as that of the PCIe™ specification.

Referring now to Table 2, shown is a mapping between LTSSM states according to the PCIe™ specification and corresponding M-PHY states in accordance with an embodiment of the present invention.

TABLE 2

| LTSSM State | M-PHY State | Details |
| --- | --- | --- |
| Detect, Polling | SAVE | State transitions through SAVE sub-states |
| Configuration | BURST | BURST (PREP, SYNC) sub-states |
| Recovery | BURST/SLEEP/STALL | May be in BURST state but will transition to BURST through SLEEP/STALL |
| L0 | BURST (payload) | BURST mode and exchange transactions |
| L0s | STALL | STALL state |
| L1 | SLEEP | SLEEP state |
| L1.OFF | HIBERN8 | HIBERN8 |
| L2 | UNPOWERED | UNPOWERED state |
| Disabled | DISABLED | DISABLED state |
| Loopback | No action | Link speed may change on entry to Loopback from Configuration |
| Hot Reset | INLINE RESET | IN-LINE RESET state |

As described above with regard to FIG. 2, embodiments provide for a consolidated sideband mechanism that can be used for link management, along with optional in-band support. In this way, using the sideband circuitry and interconnect, link management and control can occur independently of the higher speed (and greater power consuming) circuitry of the physical layer for the primary interconnect. Further in this way, this sideband channel can be used when the portions of the PHY unit associated with the primary interconnect are powered off, enabling reduced power consumption. Also, this consolidated sideband mechanism can be used before training of the primary interconnect, and also may be used when a failure is present on the primary interconnect.

Still further, via this consolidated sideband mechanism, a single interconnect, e.g., a pair of differential wires in each direction can be present, reducing both pin counts and enabling the addition of new capabilities. Embodiments may also enable faster and more robust clock/power gating and can remove ambiguities in conventional protocols such as PCIe™ sideband mechanism using this link.

Although the scope of the present invention is not limited in this regard, in different embodiments the sideband interconnect (e.g., sideband interconnect 270 of FIG. 2) can be implemented as a single wire bidirectional sideband signal, a dual-wire dual-direction unidirectional set of signals, a low speed in-band signaling mechanism such as available using an M-PHY in a low power pulse width modulation (PWM) mode or as an in-band high speed signaling mechanism such as physical layer ordered sets or DLLPs.

As examples and not for purposes of limitation, various physical layer approaches may be supported. A first approach can be a single-wire bidirectional sideband signal providing lowest pin count when a sideband interconnect is used. In some embodiments, this signal can be multiplexed on an existing sideband, e.g., PERST#, WAKE# or CLKREQ signals. A second approach may be a dual-wire dual-direction unidirectional set of signals, which may be simpler and somewhat more efficient compared to the single-wire approach, but at the cost of an additional pin. Such implementation can be multiplexed on existing sidebands, e.g., PERST# for host device and CLKREQ# for device host (in this example, the existing signal directionality is maintained, simplifying bi-modal implementations). A third approach may be a low-speed in-band signaling mechanism, such as M-PHY LS PWM modes, which reduces pin count relative to sideband mechanisms, and may still support similarly low power levels. Because this mode of operation is mutually exclusive with high-speed operation, it could be combined with a high-speed in-band mechanism such as physical layer ordered sets or DLLP. While this approach is not low power, it maximizes commonality with existing high-speed IO. When combined with low speed in-band signaling, this approach may provide a good low power solution.

To realize one or more of these configurations in a given system, a semantic layer can be provided, which can be used to determine the meaning of the information to be exchanged over the physical layer, as well as a policy layer, which can be used to comprehend the device/platform level action/reactions. In one embodiment these layers may be present in a SB PHY unit.

By providing a layered approach, embodiments allow for different physical layer implementations that may include both sideband capabilities (which may be preferred in some implementations due to simplicity and/or low power operation) and in-band, which may be preferred for other implementations, e.g., avoiding the need for additional pin count.

In one embodiment, a number of sideband signals can be configured, e.g., via the semantic layer into a single packet for communication via the consolidated sideband mechanism (or an in-band mechanism). In one embodiment, Table 3 below shows the various signals that may be present in one embodiment. In the Table shown, the logical direction of the signals is shown by the arrow, where an up arrow is defined to be the direction to the host (e.g., a root complex) and the down arrow is defined to be the direction to the device (e.g., a peripheral device such as a radio solution).

TABLE 3

| Device Present | ↑ |
| Power Good | ↓ |
| Power Off | ↓ |
| Refclock Good | ↓ |
| Fundamental Reset | ↓ |
| Config Ready | ↑↓ |
| Ready to Train | ↑↓ |
| Start Training | ↑↓ |
| L1pg Request | ↑↓ |
| L1pg Reject | ↑↓ |
| L1pg Grant | ↑↓ |
| OBFF CPU Active | ↓ |
| OBFF DMA | ↓ |
| OBFF Idle | ↓ |
| Wakeup | ↑ |
| Ack receipt of handshake | ↑↓ |

Figure 6:
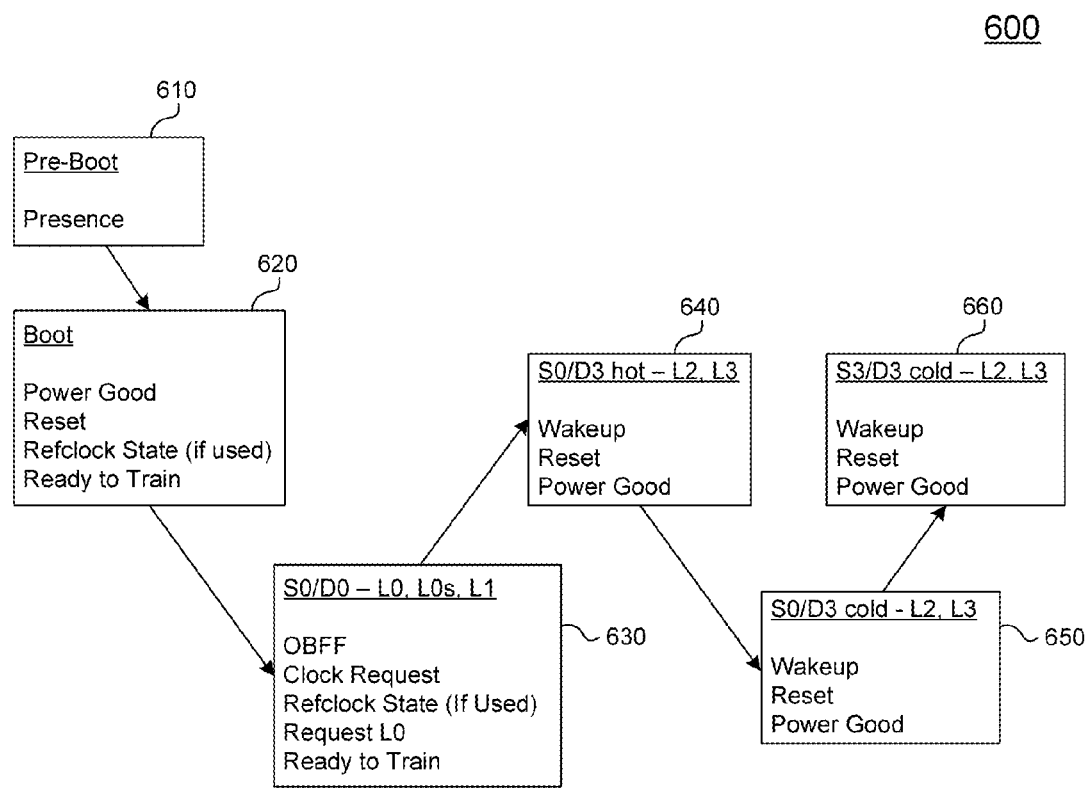
FIG. 6 is a flow diagram for the various states of a sideband mechanism in accordance with an embodiment of the present invention.

Referring now to FIG. 6, shown is a flow diagram for the various states of a sideband mechanism in accordance with an embodiment of the present invention. As shown in FIG. 6, these various states may be with regard to the root complex (e.g., host-controlled operation). State diagram 600 may provide for control of the various states via the host. As seen, operation begins in a pre-boot state 610 in which a presence signal can be communicated. Note that this presence signal may be as described above with regard to link management operations. Then control passes to a boot state 620 in which various signals may be communicated, namely a power good signal, a reset signal, a reference clock state signal and a ready to train signal. Note that all of these signals can be communicated via a single packet in which each of these signals can correspond to an indicator or field of the packet (e.g., a one bit indicator of the packet).

Still referring to FIG. 6, control passes next to an active state 630 in which a system may be in an active state (e.g., S0), a corresponding device (e.g., the downstream device may be an active device state (e.g., D0) and link may be in an active state, stall, or low power state (e.g., L0, L0s, or L1). As seen, in this state various signals can be communicated, including an OBFF signal, a clock request signal, a reference clock state, a request L0 signal and a ready to train signal.

Next, control can pass to a low power state 640, e.g., after the above signaling has been performed. As seen, in this low power state 640, the system may be in an active state while the device may be in a relatively low latency low power state (e.g., D3 hot). In addition, the link may be in a given low power state (e.g., L2 or L3). As seen in these states, the signals communicated via the consolidated sideband packet may include a wakeup signal, a reset signal, and a power good signal.

As the system goes into deeper low power states, a second low power state 650 can be entered (e.g., when the system is in an S0 state and the device is in a D3 cold state, and the link is similarly in an L2 or L3 state. As seen, the same wakeup, reset and power good signals can be communicated. Also seen in FIG. 6, the same signals can occur in a deeper power state 660 (e.g., a system low power state, S3) and a device low power state (e.g., D3 cold), and the same link low power states L2 and L3. Although shown with this particular set of sideband information communicated, understand the scope of the present invention is not limited in this regard.

Embodiments thus provide a layered structure with extensibility that can balance simplicity and low latency versus flexibility. In this way, existing sideband signals and additional sideband signals can be replaced with a smaller number of signals, and enable future expansion of sideband mechanisms without addition of more pins.

Figure 7:
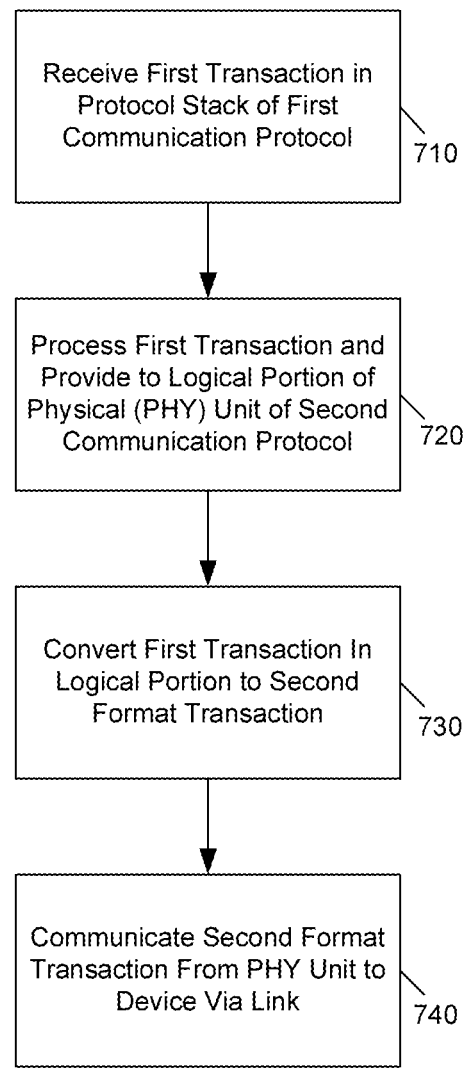
FIG. 7 is a flow diagram of a method in accordance with an embodiment of the present invention.

Referring now to FIG. 7, shown is a flow diagram of a method in accordance with an embodiment of the present invention. As shown in FIG. 7, method 700 may be used to communicate data via a converged protocol stack that includes upper layers of one communication protocol and a lower, e.g., physical layer of a different communication protocol. In the examples shown assume a converged protocol stack as described above, namely with upper transaction and data link layers of a PCIe™ protocol and a physical layer of a different specification, e.g., a MIPI specification. Of course, additional logic to enable the convergence of these two communication protocols into a single protocol stack also may be present, such as the logic and circuitry discussed above with regard to FIG. 4.

As seen in FIG. 7, method 700 can begin by receiving a first transaction in a protocol stack of the first communication protocol (block 710). For example, various logic of a root complex such as a core, other execution engine or so forth seeks to send information to another device. Accordingly, this information may pass to the transaction layer. As seen, control passes to block 720 where the transaction can be processed and provided to a logical portion of a PHY of a second communication protocol. This processing may include the various operations discussed above with regard to the flow through FIG. 4 where different operations to receive data, perform flow control, link operations, packetizing operations and so forth can occur. In addition, various operations to provide a data link layer packet to a PHY can occur. Next, control passes to block 730 where this first transaction can be converted in a logical portion of the PHY to a second format transaction. For example any conversion of the symbols (if needed) can be performed. In addition, the various translation operations done to thus render the transaction into a format for transmission on the link can occur. Accordingly, control can pass to block 740 where this second formatted transaction can be communicated from the PHY to the device via a link. As an example, the second format transaction can be the serialized data after line coding, serialization and so forth. Although shown at this high level in the embodiment of FIG. 7, understand the scope of the present invention is not limited in this regard.

Figure 8:
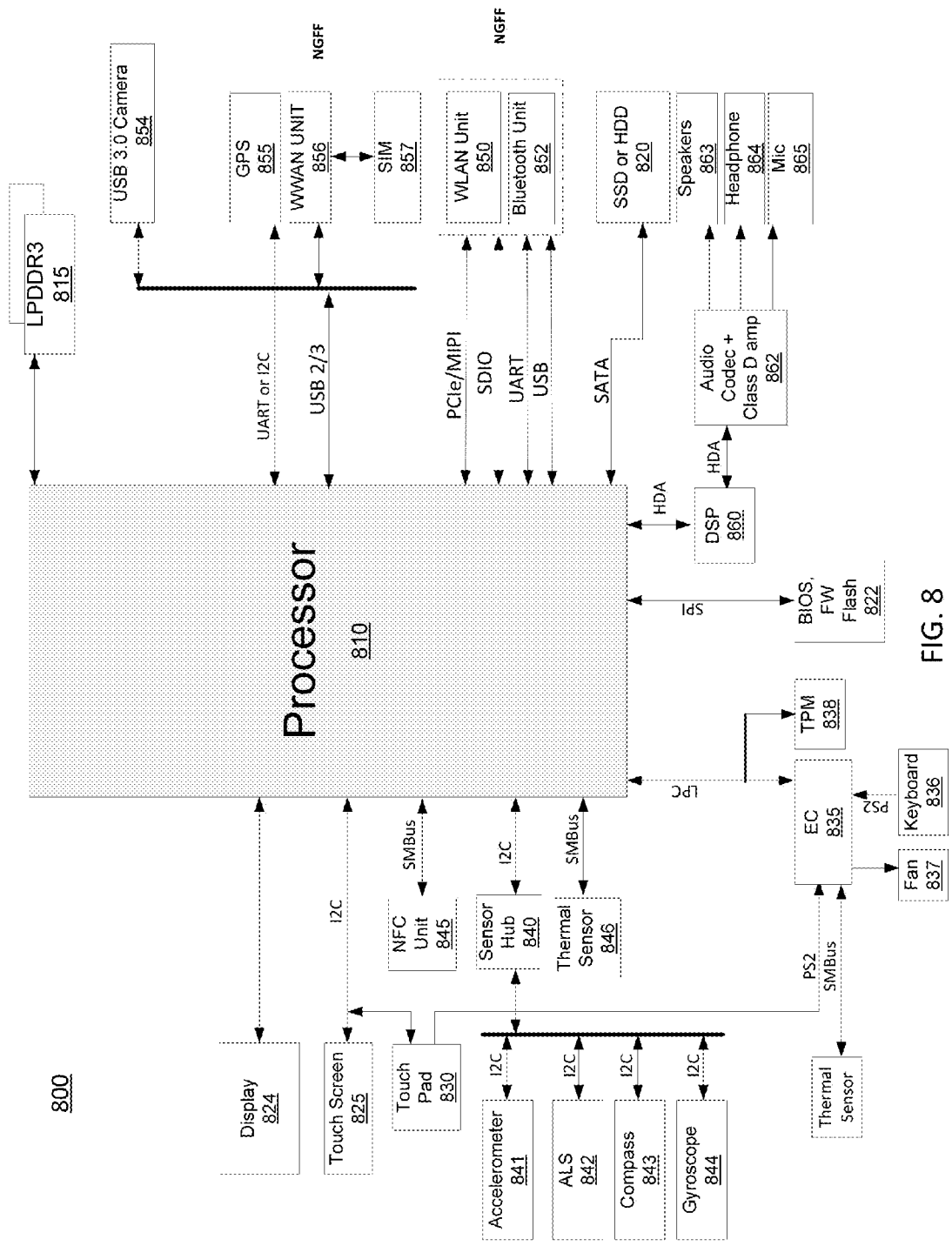
FIG. 8 is a block diagram of components present in a computer system in accordance with an embodiment of the present invention.

Referring now to FIG. 8, shown is a block diagram of components present in a computer system in accordance with an embodiment of the present invention. As shown in FIG. 8, system 800 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 8 is intended to show a high level view of many components of the computer system. However, it is to be understood that additional components may be present in certain implementations and furthermore, different arrangement of the components shown may occur in other implementations.

As seen in FIG. 8, a processor 810, which may be a low power multicore processor socket such as an ultra low voltage processor, may act as a main processing unit and central hub for communication with the various components of the system. Such processor can be implemented as a SoC. In one embodiment, processor 810 may be an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor.

Processor 810 may communicate with a system memory 815, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I$^2$C interconnect. As further shown in FIG. 8, in addition to touch screen 825, user input by way of touch can also occur via a touch pad 830 which may be configured within the chassis and may also be coupled to the same I$^2$C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I$^2$C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment. Understand also that one or more of the sensors can couple to processor 810 via a LPS link in accordance with an embodiment of the present invention.

Also seen in FIG. 8, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 such as in accordance with the Trusted Computing Group (TCG) TPM Specification Version 1.2 (Oct. 2, 2003), may also couple to processor 810 via this LPC interconnect.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect via a low power interconnect such as a converged PCIe/MIPI interconnect as described herein, or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864.

Figure 9:
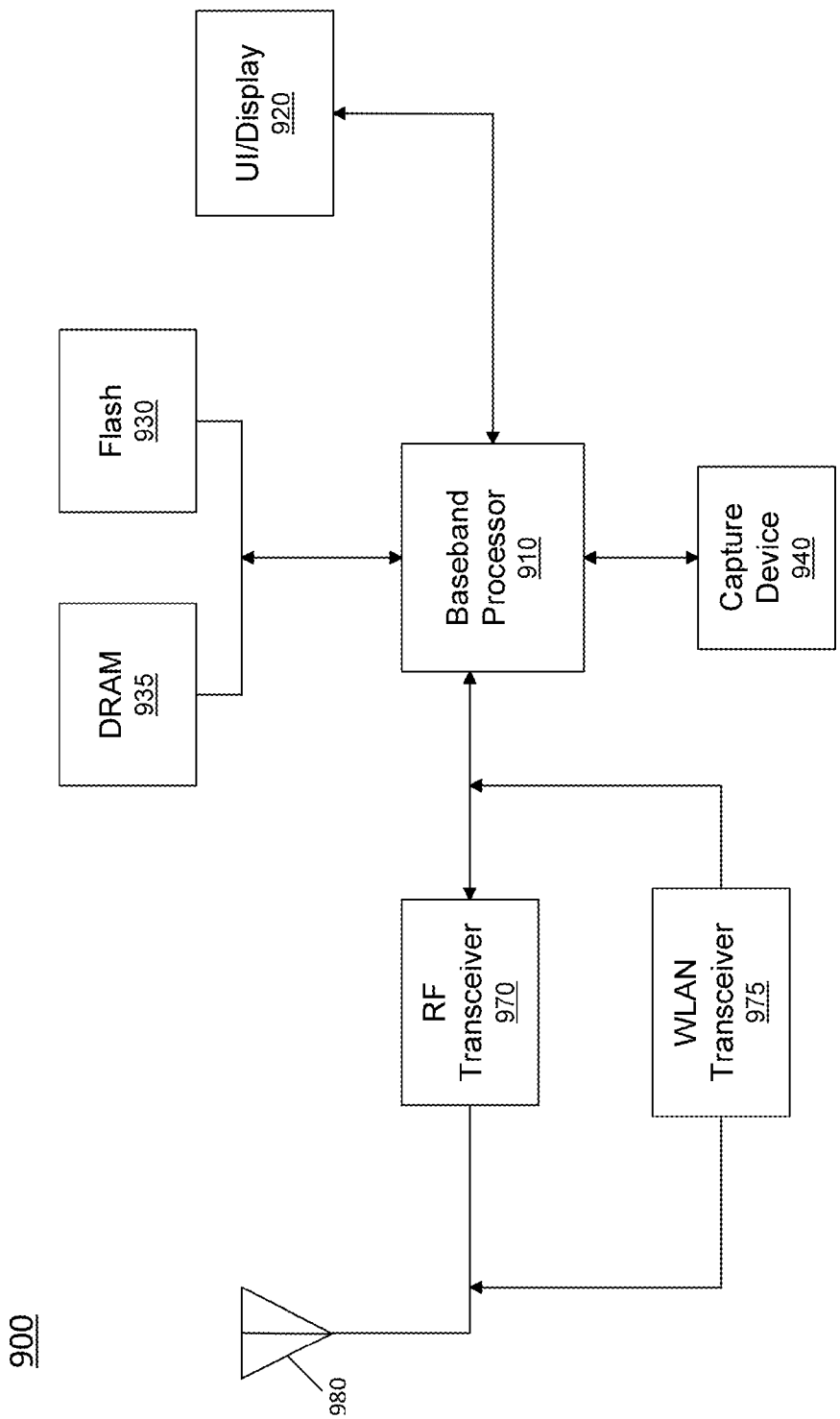
FIG. 9 is a block diagram of an example system with which embodiments can be used.

Embodiments thus can be used in many different environments. Referring now to FIG. 9, shown is a block diagram of an example system 900 with which embodiments can be used. As seen, system 900 may be a smartphone or other wireless communicator. As shown in the block diagram of FIG. 9, system 900 may include a baseband processor 910 which may be a multicore processor that can handle both baseband processing tasks as well as application processing. Thus baseband processor 910 can perform various signal processing with regard to communications, as well as perform computing operations for the device. In turn, baseband processor 910 can couple to a user interface/display 920 which can be realized, in some embodiments by a touch screen display. In addition, baseband processor 910 may couple to a memory system including, in the embodiment of FIG. 9 a non-volatile memory, namely a flash memory 930 and a system memory, namely a dynamic random access memory (DRAM) 935. As further seen, baseband processor 910 can further couple to a capture device 940 such as an image capture device that can record video and/or still images.

To enable communications to be transmitted and received, various circuitry may be coupled between baseband processor 910 and an antenna 980. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 975, local wireless signals, such as according to a Bluetooth™ standard or an IEEE 802.11 standard such as IEEE 802.11a/b/g/n can also be realized. Note that the link between baseband processor 910 and one or both of transceivers 970 and 975 may be via a low power converged interconnect that combines and maps functionality of a PCIe™ interconnect and a low power interconnect such as a MIPI interconnect. Although shown at this high level in the embodiment of FIG. 9, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An integrated circuit (IC) comprising:
a protocol stack for a Peripheral Component Interconnect Express™ (PCIe™) communication protocol, the protocol stack having a transaction layer and a link layer;
a first physical (PHY) unit coupled to the protocol stack to provide communication between the IC and a device coupled to the IC via a physical link, the first PHY unit of a low power communication protocol and including a physical unit circuit according to the low power communication protocol and a logical layer to interface the protocol stack to the physical unit circuit, the logical layer including a link training state machine to perform link training of the physical link and a mapping logic to map first special symbols of the PCIe™ communication protocol to second special symbols of the low power communication protocol; and a second PHY unit separate from the first PHY unit to provide communication between the IC and the device via a sideband channel separate from the physical link, wherein the link training state machine is to configure the physical link responsive to receipt of a presence signal in the second PHY unit from the device.

2. The IC of claim 1, wherein the sideband channel comprises a serial link.

3. The IC of claim 1, wherein the second PHY unit is to transmit a first presence signal to the device and to receive the presence signal from the device.

4. The IC of claim 1, wherein the physical link has an asymmetric width from the IC to the device as from the device to the IC, and is configurable to operate at an asymmetric frequency from the IC to the device as from the device to the IC.

5. The IC of claim 1, wherein the link training state machine is to a priori initialize the physical link to an initial link width and frequency from a reset of the IC without a negotiation with the device.

6. The IC of claim 5, wherein the link training state machine is to cause a change in a link width of the physical link without a negotiation with the device.

7. A non-transitory machine-readable medium having stored thereon instructions, which if performed by a machine cause the machine to perform a method comprising:

performing, in a first integrated circuit coupled to a second integrated circuit via a physical link, a detection state of a link training state machine of a physical (PHY) unit of a low power communication protocol including a physical unit circuit and a mapping logic to map first special symbols of a Peripheral Component Interconnect Express™ (PCIe™) communication protocol to second special symbols of the low power communication protocol, the PHY unit coupled to a protocol stack for the PCIe™ communication protocol having a transaction layer and a link layer, responsive to power on of the first integrated circuit;

performing, in the first integrated circuit, a configuration state of the link training state machine after performing the detection state, including sending a configuration ready signal to the second integrated circuit via a sideband link coupled between the first and second integrated circuits; and performing, in the first integrated circuit, a stall state of the link training state machine responsive to receipt of a second configuration ready signal from the second integrated circuit via the sideband link, wherein the PHY unit is to drive a differential-N signal on the physical link during the stall state.

8. The non-transitory machine-readable medium of claim 7, wherein the sideband link comprises a serial link.

9. The non-transitory machine-readable medium of claim 7, wherein the method further comprises initiating a burst sequence in the stall state to transition into an active state of the link training state machine.

10. The non-transitory machine-readable medium of claim 9, wherein the method further comprises communicating a payload from the first integrated circuit to the second integrated circuit in the active state and thereafter communicating a tail of burst signal to transition to the stall state.

11. The non-transitory machine-readable medium of claim 9, wherein the method further comprises transitioning from the active state to a power off state responsive to a communication received in the PHY unit from the protocol stack.

12. The non-transitory machine-readable medium of claim 9, wherein the method further comprises transitioning from the active state to a recovery state responsive to a receiver error.

13. The non-transitory machine-readable medium of claim 7, wherein the method further comprises transitioning from the stall state into a first low power state and driving the differential-N signal on the physical link in the first low power state.

14. The non-transitory machine-readable medium of claim 13, wherein the method further comprises transitioning from the first low power state to the stall state responsive to receipt of a presence signal from the second integrated circuit via the sideband link.

15. The non-transitory machine-readable medium of claim 13, wherein the method further comprises transitioning to a second low power state from the stall state when a set of predetermined conditions have been met, the second low power state lower than the first low power state, and driving a differential high impedance signal on the physical link in the second low power state.

16. The non-transitory machine-readable medium of claim 7, wherein the method further comprises:

sending a stall initiation signal to the second integrated circuit via the sideband channel; and transitioning to the stall state responsive to receipt of a stall indication signal from the second integrated circuit via the sideband link.

17. A system comprising:

a multicore processor including a plurality of cores and a protocol stack to enable communication between the multicore processor and a device via a physical link, the protocol stack including:

a transaction layer in accordance with a Peripheral Component Interconnect Express (PCIe™) communication protocol;

a data link layer in accordance with the PCIe™ communication protocol; and a physical layer including a physical layer transmit controller and a physical (PHY) unit transmit circuit according to a low power communication protocol, wherein the physical layer transmit controller is to adapt the PHY unit transmit circuit to the transaction layer and the data link layer, the physical layer further including a link training state machine to perform link training of the physical link, a mapping logic to map first special symbols of the PCIe™ communication protocol to second special symbols of the low power communication protocol, wherein the link training state machine is, responsive to power on of the multicore processor, to perform a configuration state of the link training state machine after performing a detection state, including sending a configuration ready signal to the device via a sideband link; and the device coupled to the multicore processor via the physical link and the sideband link.

18. The system of claim 17, wherein the link training state machine is to communicate a payload from the multicore processor to the device in an active state and thereafter communicate a tail of burst signal to transition to a stall state.

19. The system of claim 18, wherein the link training state machine is to signal a stall initiation signal to the device via the sideband link, and transition to the stall state responsive to receipt of a stall indication signal from the device via the sideband link.

* * * * *